May 16, 1939.   L. J. FORD   2,158,932
FISHING ROD
Filed Nov. 29, 1937
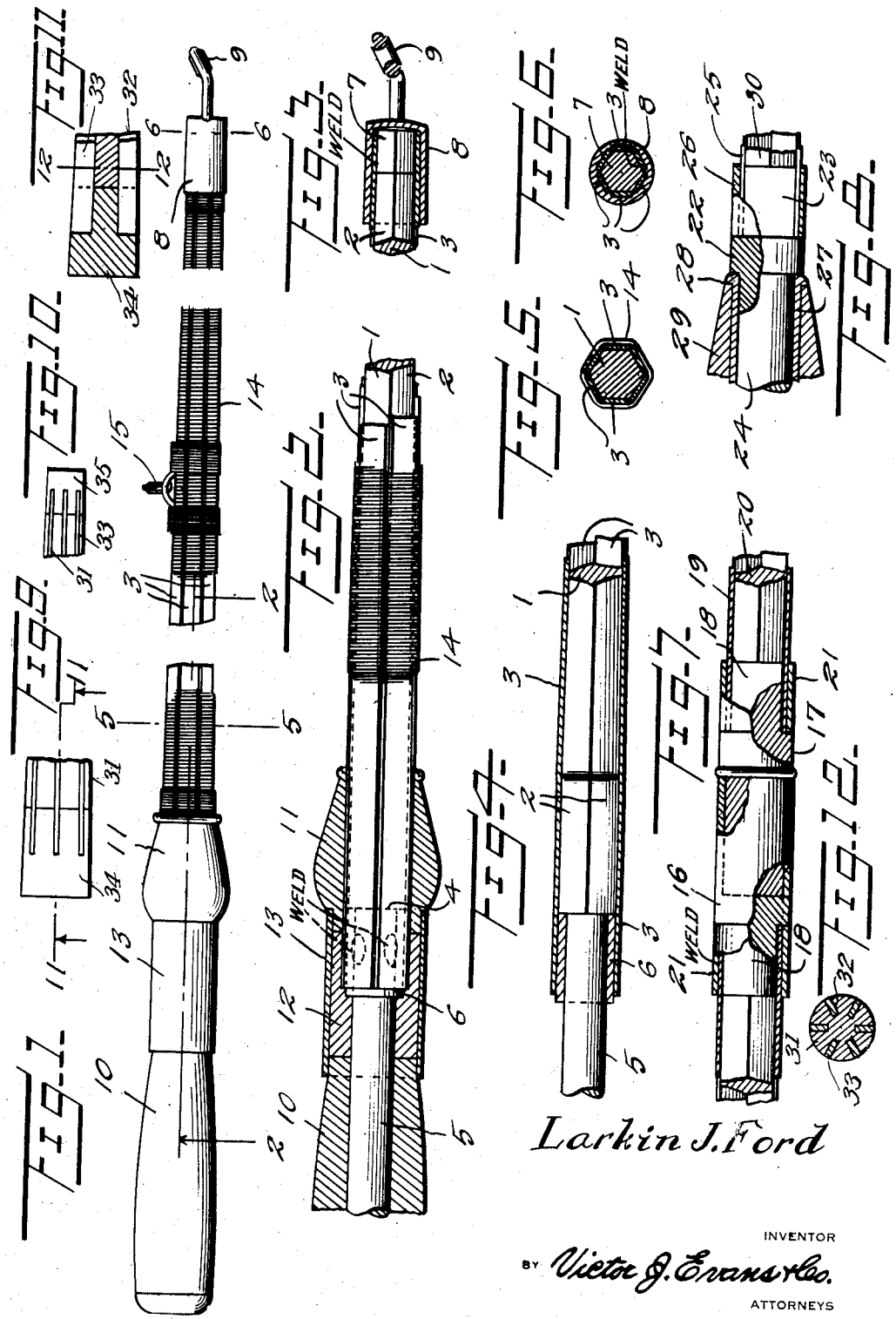
Larkin J. Ford
INVENTOR
BY Victor J. Evans & Co.
ATTORNEYS Patented May 16, 1939

2,158,932

UNITED STATES PATENT OFFICE 2,158,932

FISHING ROD

Larkin J. Ford, Owensboro, Ky., assignor of one-half to William P. Hayden, Owensboro, Ky.

Application November 29, 1937, Serial No. 177,106

3 Claims. (Cl. 43—18)

This invention relates to fishing rods, and its general object is to provide a rod that includes all of the qualities and advantageous features of bamboo and steel rods in that it is light in weight but stronger than a bamboo rod and has more resiliency and whip than a steel rod, yet will retain its flexibility and shape as well as the quality of returning to a straight condition after long usage and under all conditions, and can be used for both fresh and salt water fishing, without fear of corroding or rusting.

A further object is to provide a fishing rod that is made up of both wood and metal, the wood providing a core which is covered or incased by strips of spring metal, such as steel, fixed thereon and with respect thereto to prevent separation or displacement, regardless of the extent the rod is bent or flexed.

A further object is to provide a fishing rod of the character set forth that can be made into sections, is simple in construction, inexpensive to manufacture and extremely efficient in use and service.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a fragmentary view illustrating a fishing rod constructed in accordance with the present invention.

Figure 2 is a sectional view taken approximately on line 2—2 of Figure 1, looking in the direction of the arrows.

Figure 3 is a longitudinal sectional view taken through the tip end of the rod with parts in elevation.

Figure 4 is a fragmentary sectional view with the handle members removed.

Figure 5 is a sectional view taken approximately on line 5—5 of Figure 1, looking in the direction of the arrows.

Figure 6 is a sectional view taken approximately on line 6—6 of Figure 1, looking in the direction of the arrows.

Figure 7 is a fragmentary view illustrating the manner of constructing a sectional rod in accordance with my invention, with parts broken away and in section.

Figure 8 is a fragmentary detail view of a slightly modified form with parts in section.

Figure 9 is a fragmentary view of one end of a modified form of strip reinforced core.

Figure 10 is a similar view of the opposite end.

Figure 11 is a sectional view taken approximately on line 11—11 of Figure 9, looking in the direction of the arrows.

Figure 12 is a sectional view taken approximately on line 12—12 of Figure 11.

Referring to the drawing in detail, and particularly to Figures 1 to 6 inclusive, it will be noted that the rod which forms the subject matter of the present invention includes a rod like body 1 that is preferably solid throughout its length and is made from wood that is strong but light in weight. The body 1 provides a core of a length substantially that of a finished rod, and the body for the major portion of its length is formed with flat faces 2 extending longitudinally thereof to provide seats for relatively thin narrow strips 3 of spring metal, such as steel, that are adhesively or otherwise secured to the flat faces, to incase the body, in that the longitudinal edges of the strips 3 are disposed in abutting relation as best shown in Figures 5 and 6, but may be spaced a considerable distance apart, it depending of course upon the width of the strips, with respect to the width of the faces.

The body is tapered in the usual manner from adjacent the handle receiving end thereof to its opposite end, and the handle receiving end is reduced to provide a shoulder 4 from which extends the reduced portion 5. Mounted on the reduced portion and engaging the shoulder is a metallic sleeve band 6 which has welded or otherwise secured thereto one of the ends of the strips 3, while the opposite ends are similarly fixed to a filler block or plug 7 that contacts the tip end of the body, as best shown in Figure 3, and mounted on the filler block is a tip cap 8 which is of a length to extend inwardly beyond the block 7 for fitting association about the strips, and the tip cap includes the usual line guide 9 which may be of any well known construction.

Mounted on the reduced portion 5 is the outer handle section 10, while surrounding the strip receiving portion of the body inwardly of the reduced portion 5 is the inner handle section 11, and disposed between the sections 10 and 11 is the intermediate section 12, the latter having a shouldered bore for fitting association with the sleeve band 6 and the ends of the spring strips 3, as best shown in Figure 2, and disposed about the section 12 is a ferrule 13 that is of a length to surround the reduced confronting end portions of the sections 10 and 11, for securing all the sections together, as will be apparent.

The exposed portions of the strips 3 are wound with thread 14 of the kind generally used for fishing rods, and such may be wound in any manner, but the windings are preferably disposed close together at the inner and outer ends of the rod or in other words at those portions adjacent the section 11 and the tip cap 8, as shown in Figure 1. The guides 15 are likewise secured to the rod by the thread which is wound close together for that purpose. After the windings of the thread or cord has been completed, the pole is finished on its surface with varnish, lacquer or other water proof material. Prior to the time the thread or cord is wound about the strips, the latter may be painted or coated with some suitable material.

In Figure 7, I have illustrated a sectional rod constructed in accordance with the present invention, and which includes a socket member 16 to receive the plug member 17 that is associated therewith in the usual manner as shown, and both of the members 16 and 17 are provided with reduced outer end portions 18 to which are welded the ends of the strips 19, while the ends of the core or body sections 20 are disposed in abutting relation with respect to the outer ends of the portions 18, as shown. Surrounding the ends of the strips 19 are ferrules 21.

In Figure 8 I have illustrated a modified or detachable form of handle connection for my rod, and which includes a handle receiving member 22 having reduced end portions 23 and 24, the portion 23 having secured thereto, the ends of the strips 25, and a ferrule 26 is disposed about the ends of the strips, as shown. The handle which is detachable in this form, includes a tubular member 27 for frictionally receiving the portion 24, and has a shoulder 28 at the inner end thereof, to act as an abutment for the inner end of a handle section 29. The body of core which in this form is indicated by the reference numeral 30, is disposed in abutting relation with the reduced portion 23, while the opposite end of the body abuts a plug 7 that has the strips 25 secured thereto and mounted on the plug and strips 25 is a tip cap 8, exactly in the same manner as shown in Figure 3.

Figures 9 to 12 inclusive, disclose the modified form which includes a tapered body or core 31 that is provided with radial grooves 32 extending longitudinally thereof, throughout its length, and mounted and fixed in the grooves by adhesive material are strips 33 similar to the strips 3 in that the strips 33 are spring metal such as steel. The strips 33 are embedded in the grooves, so that the outer longitudinal edges are flush with the outer surface of the body 31 and the strips extend beyond the ends of the body. One of the ends of the strips 33 are fixed in grooves radially disposed in a plug 34 to which is attached the handle of the rod, while the opposite ends of the strips 33 are fixed in like disposed grooves in a tip cap receiving block or plug 35. The strip reinforced body or core in this form is wrapped and finished in the same manner as the other forms.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. A fishing rod comprising a tapered rod like body formed from flexible wood and providing a core, relatively thin narrow strips of resilient metal secured to and extending longitudinally of the body with the inner longitudinal edges of the sides thereof disposed in edge to edge contact throughout the length of the strips for the latter to encase the body, said body having a reduced end portion providing a shoulder, a sleeve band disposed about the reduced end portion and abutting the shoulder, a plug abutting the opposite end of said body, said band and plug having the strips fixed thereto for holding the latter in tubular formation about the body, a handle secured to the body about the reduced end portion thereof and about the adjacent ends of the strips, a tip cap secured about the plug and the ends of the strips adjacent thereto, a line guide secured to the tip cap, thread wound about the exposed portions of the strips, and line guides secured to the strips by the thread.

2. A fishing rod comprising a tapered rod like body formed from flexible wood and providing a core, relatively thin narrow strips of resilient metal secured to and extending longitudinally of the body with the inner longitudinal edges of the sides thereof disposed in edge to edge contact throughout the length of the strips for the latter to encase the body, said body having a reduced end portion providing a shoulder, a sleeve band disposed about the reduced end portion and abutting the shoulder, a plug abutting the opposite end of the body, said band and plug having the strips fixed thereto for holding the latter in tubular formation about the body, a handle for the rod and including an outer section mounted on and secured to the reduced end portion, an inner section surrounding the strips, an intermediate section between the outer and inner sections and in end to end abutting relation therewith, a ferrule surrounding the intermediate section and the adjacent ends to the outer and inner sections for securing the sections together, said intermediate section having a shouldered bore therein fittingly receiving the sleeve band and the ends of the strips secured thereto, a tip cap secured about the plug and the ends of the strips adjacent thereto, and line guides secured to the tip cap and strips.

3. A fishing rod comprising a tapered rod like body formed from flexible wood and providing a core, relatively thin narrow strips of resilient metal secured to and extending longitudinally of the body with the inner longitudinal edges of the sides thereof disposed in edge to edge contact throughout the length of the strips for the latter to encase the body, a handle receiving member including reduced end portions, one of said end portions having one of the ends of the strips fixed thereto and the adjacent end of the body in abutting relation therewith, a handle secured to the other reduced end portion, a ferrule disposed about the fixed ends of the strips, a plug having the opposite ends of the strips fixed thereto and the opposite end of the body in abutting relation therewith, a tip cap disposed about the last mentioned ends of the strips, and line guides secured to the tip cap and strips.

LARKIN J. FORD.